United States Patent [19]

Mashimo et al.

[11] Patent Number: 4,740,192

[45] Date of Patent: Apr. 26, 1988

[54] POWER TRANSMISSION BELT

[75] Inventors: Satoshi Mashimo, Akashi; Hajime Kakiuchi, Itami; Kazutoshi Ishida, Kobe; Masayoshi Nakajima, Ashiya, all of Japan

[73] Assignee: Mitsuboshi Belting Ltd., Kobe, Japan

[21] Appl. No.: 869,239

[22] Filed: Jun. 2, 1986

[30] Foreign Application Priority Data

Jun. 3, 1985 [JP] Japan ................................ 60-121048

[51] Int. Cl.⁴ ................................................ F16G 5/06
[52] U.S. Cl. ..................................... 474/263; 474/271
[58] Field of Search ............... 474/263, 264, 266, 268, 474/270, 271, 260

[56] References Cited

U.S. PATENT DOCUMENTS

| 2,321,580 | 6/1943 | Conradson | 474/270 |
|---|---|---|---|
| 2,491,188 | 12/1949 | Lesesne | 474/271 X |
| 3,871,946 | 3/1975 | Romanski et al. | 474/270 X |
| 4,012,962 | 3/1977 | Ballou et al. | 474/264 |
| 4,031,768 | 6/1977 | Henderson et al. | 74/233 |
| 4,299,588 | 11/1981 | Standley | 474/264 |
| 4,355,994 | 10/1982 | Brew | 474/270 |
| 4,443,280 | 4/1984 | Standley | 156/137 |
| 4,464,153 | 8/1984 | Brew | 474/270 |
| 4,475,968 | 10/1984 | Brew | 156/141 |
| 4,511,521 | 4/1985 | Standley | 264/24 |

FOREIGN PATENT DOCUMENTS 18456 11/1980 European Pat. Off. .
1535142 8/1968 France .
1130820 4/1967 United Kingdom .

OTHER PUBLICATIONS

"Development of Advanced Composite Materials", T. Furuta, International Polymer Science and Technology, vol. 9, No. 3, 1982, pp. 110–116.

"Siliciumcarbid-Whisker, das Verstarkermaterial der Zukunft", Von A. Lipp, Feinwerktechnik vol. 74, No. 4, 1970, pp. 150–154.

"The Field is Wide Open for Reinforcements", John V. Milewski, Plastics Engineering, vol. 34, No. 11, Nov. 1978, pp. 23–28.

Primary Examiner—Stephen J. Novosad
Assistant Examiner—Thuy M. Bui
Attorney, Agent, or Firm—Wood, Dalton, Phillips, Mason & Rowe

[57] ABSTRACT

A power transmission belt wherein at least a portion thereof is formed as a composite of 1 to 100 parts by weight of whiskers distributed in 100 parts by weight of rubber. The composite may form the compression section of the belt. The composite may be utilized as impregnating rubber for a fabric cover portion of the belt. The whiskers preferably have a diameter in the range of approximate 0.1 micron to 1.0 micron, and a length of approximately 10 microns to 500 microns. In the illustrated embodiment, the whiskers are acicular single crystal whiskers.

19 Claims, 1 Drawing Sheet

U.S. Patent  Apr. 26, 1988  4,740,192
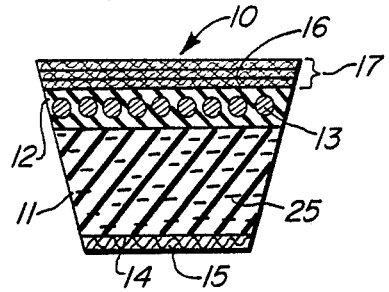
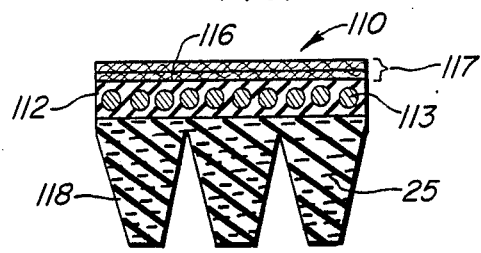
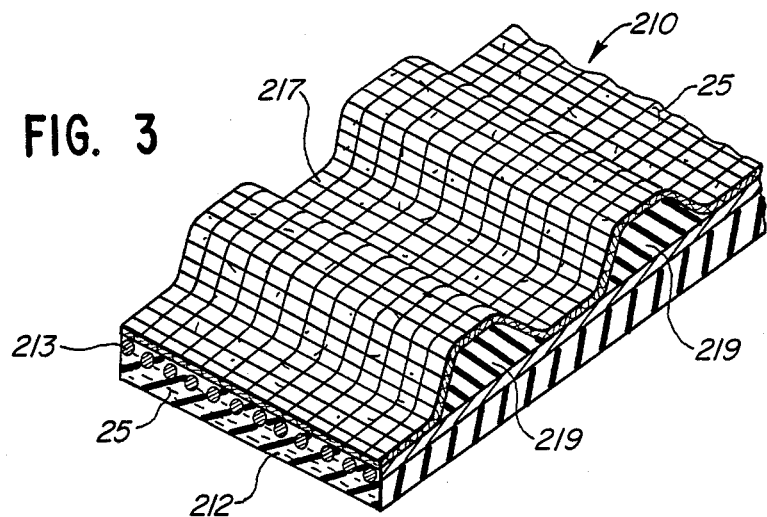
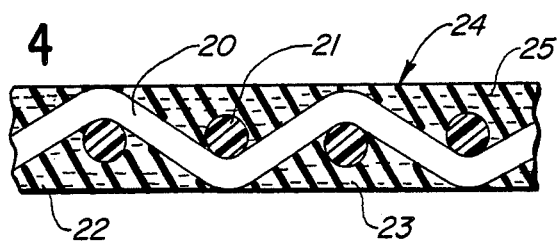

POWER TRANSMISSION BELT

TECHNICAL FIELD

This invention relates to power transmission belts and in particular to power transmission belts having at least a portion thereof formed of rubber.

BACKGROUND ART

It is desirable to provide high wear and buckling resistance in power transmission belts by improving the formulation of the composition of rubber portions of the belt. Such belts may conventionally comprise frictional transmission belts, such as V-shaped or V-ribbed belts, or toothed belts.

It is further desirable to minimize maintenance and cost in the use of such drive belts by providing belts which have long, troublefree life while transmitting high loads.

It has been found that the achievement of these desirable characteristics may be effected by providing in the belt high elasticity and wear resistance in the transverse direction and high bending resistance in the longitudinal direction.

It has been conventional to mix carbon black with the rubber in such belts to improve the wear resistance thereof. Further, it has been conventional to provide cut fibers of cotton, nylon, polyester, etc., in the rubber composition oriented transversely of the belt and utilized as the compression layer portion of the belt.

Another method of improving the power transmission characteristics of such belt is to utilize in the compression layer portion rubber mixed with graphite.

Such additives have also been employed in the tension portion of the belt to improve the wear resistance.

A problem arises in the use of high quantities of carbon black in that substantial heat is generated during the operation of such belts and the useful lifetime of the belt may be decreased due to the decreased bendability.

Similarly, where a large quantity of cut fibers is provided extending transversely across the belt, internal heat is generated and the bendability decreases, thereby shortening the useful life of the belt. Similar problems arise in the use of graphite in this manner.

DISCLOSURE OF THE INVENTION

It has therefore been a longstanding, vexatious problem to provide long, troublefree life with high wear resistance in such power transmission belts. The present invention comprehends an improved power transmission belt structure which solves this difficult problem in a novel and simple manner.

The present invention further comprehends means for improving the wear resistance of a cover layer when employed in such belts.

The invention maintains the improved wear resistance of such belts for a long period of time under a wide range of environmental conditions while maintaining desirable buckling resistance.

More specifically, the invention comprehends providing a belt body having at least a portion thereof formed as a composite of 1 to 100 parts by weight of whiskers distributed in 100 parts by weight of rubber.

In a preferred form, the whiskers are present in the amount of approximately 2 to 60 parts by weight per 100 parts by weight of rubber.

In the illustrated embodiment, the whiskers are formed by any one of a number of diferrent silicon compounds, metal oxides, graphite, and/or iron, copper and nickel metal.

In the illustrated embodiment, the whiskers have a diameter in the range of approximately 0.1 microns to 1.0 microns, and a length in the range of approximately 10 microns to 500 microns.

In the illustrated embodiment, the whiskers are acicular.

The whiskers may be provided in the fabric cover of the belt, as well as in one or more of the body portions of the belt.

The power transmission belt of the present invention is extremely simple and economical of construction while providing highly improved wear resistance, concomitant long, troublefree life.

BRIEF DESCRIPTION OF THE DRAWING

Other features and advantages of the invention will be apparent from the following description taken in connection with the accompanying drawing wherein:

FIG. 1 is a transverse section of a power transmission V-belt embodying the invention;

FIG. 2 is a transverse section of a V-ribbed belt embodying the invention;

FIG. 3 is a fragmentary perspective view of a toothed belt embodying the invention; and FIG. 4 is a transverse section of a cover fabric for use in a power transmission belt of the invention.

BEST MODE FOR CARRYING OUT THE INVENTION

In the illustrative embodiment of the invention as disclosed in FIG. 1 of the drawing, a power transmission belt generally designated 10 is shown to comprise a V-belt having a compression portion 11 and an outer tension portion 12 provided with longitudinally extending tensile cords 13 spaced transversely of the belt.

The inner surface 14 of the compression portion may be provided with a fabric cover layer 15 and the outer surface 16 of the tension portion may be provided with an outer multilayer fabric cover 17.

In FIG. 2, a power transmission belt generally designated 110 is seen to comprise a V-ribbed belt having a plurality of transversely associated ribs 118, an outer tension portion 112, having a plurality of transversely spaced longitudinally extending tensile cords 113, and an outer fabric cover 117 on the outer surface 116 of the tension portion 112.

In the embodiment illustrated in FIG. 3, a toothed power transmission belt generally designated 210 includes an outer tension portion 212, having longitudinally extending transversely spaced tensile cords 213 therein, longitudinally spaced teeth 219, and a cover fabric 217.

The tensile cords 13, 113, and 213 are of conventional construction, being formed of high strength, low elongation material, such as polyester fiber, aromatic polyamide fiber, glass fiber, etc.

The tension sections may comprise the cushion rubber section of the belt in which the tensile cords are embedded.

The present invention comprehends forming of the compression section rubber, cushion rubber or tension section rubber, ribs, and teeth of a rubber composite having a distribution of whiskers therein. Additionally, the invention comprehends the provision of a whisker-containing rubber material impregnated in the cover fabric. The use of the whiskers in the rubber portions of the belt provide improved wear and buckling resistance and the provision of the whiskers in the impregnation rubber of the cover fabric provides improved wear resistance thereof.

As shown in the drawing, the whiskers are oriented transversely of the belt. In addition to the whiskers, cut fibers may be distributed in the rubber portion, as desired.

In the illustrated embodiment, the cover fabric, as illustrated in FIG. 4, may comprise warps 20 and wefts 21, with the interstices therebetween filled with impregnating rubber 22 in which is distributed an inorganic filler 23. The fabric layer 24 may alternatively be nonwoven as desired.

The invention comprehends providing in the rubber portions of the belt, including the impregnating rubber of the cover fabric, distributed whiskers 25. It has been found that the use of the whiskers provides substantially improved wear and buckling resistance of the impregnated fabric layers.

The invention comprehends the use of such whiskers having a diameter in the range of approximately 0.1 to 1.0 microns and a length in the range of approximately 10 to 500 microns. The whiskers comprise acicular, single crystal needles.

The whiskers may be formed of one or more of alpha-silicon carbide, beta-silicon carbide, silicon nitride, alpha-alumina, titanium oxide, zinc oxide, tin oxide, graphite, iron, copper, or nickel.

The invention comprehends the use of a coupling agent in providing improved coupling of the whiskers to the embedding rubber. The invention comprehends the use of silane and titanium coupling agents for this purpose.

The preferred ratio of whiskers to rubber is 2 to 60 parts by weight to 100 parts by weight of rubber.

The invention further comprehends the provision of ceramic powder in the rubber composite in the amount of approximately 5 to 10 parts by weight to 100 parts by weight of rubber.

The rubber utilized in the belt may comprise any suitable conventional rubber, including chloroprene rubber, nitrile rubber, natural rubber, styrene butadiene rubber, hydrogenated nitrile rubber, chlorosulfonated polyethylene rubber, epichlorohydrin rubber, acryl rubber, and polyurethane alone or mixed.

Conventional softening and age-preventing agents may be included in the formulation, as well as working aids, vulcanization accelerators, and cross-linking agents, as are well-known to those skilled in the art.

The mixing of the ingredients may be effected by kneading, by means of a Banbury mixer, or kneader rolls.

Where the cut fiber is utilized, it may be formed of cotton, nylon, polyester, etc. Preferably the amount of cut fiber is limited to prevent deterioration of the bendability characteristics of the belt.

The impregnation of the cover layer of fabric with the rubber composition may be effected by coating of the rubber composition thereon in a calender device, dipping the fabric in a rubber paste, dissolving the rubber composite in a solvent and coating it onto the fabric by a roll coater or doctor knife, etc.

A number of examples of belts manufactured in accordance with the invention were constructed. As brought out in the following Table 1, two examples of V-ribbed belts embodying the invention were constructed and compared with three V-ribbed belts of the prior art not utilizing the whiskers of the present invention.

TABLE 1

| | Comparison Example V-ribbed | | | Example V-ribbed | |
|---|---|---|---|---|---|
| | 1 | 2 | 3 | 1 | 2 |
| Chloroprene rubber | 100 | 100 | 100 | 100 | 100 |
| Stearic acid | 1 | 1 | 1 | 1 | 1 |
| Magnesium oxide | 4 | 4 | 4 | 4 | 4 |
| Age-preventing agent | 2 | 2 | 2 | 2 | 2 |
| Processed oil | 5 | 5 | 5 | 5 | 5 |
| HAF carbon black | 35 | 50 | 35 | 35 | 35 |
| Cut cotton yarn | 15 | 15 | 25 | 15 | 15 |
| Beta-silicon carbide whisker | | | | 10 | 20 |
| Silane coupling agent (gamma-mercaptopropyl trimethoxysilane) | | | | 1 | 1 |
| Zinc oxide | 5 | 5 | 5 | 5 | 5 |
| Ethylene thiourea | 0.5 | 0.5 | 0.5 | 0.5 | 0.5 |

As shown in Table 1, the V-ribbed belts of the invention were similar to the comparison example 1 belt, with the exception of the inclusion of the whiskers and coupling agent.

Each of the mixtures of the five examples were kneaded in a Banbury mixer, rolled by calender rolls, and vulcanized under ordinary vulcanizing conditions at 150° C. for 30 minutes. After cooling, the physical properties of the belts were measured, as shown in Table 3 herefollowing.

Both cut fibers and whiskers were utilized, being oriented in a transverse direction. The belt included three ribs each 975 mm. in length.

The reverse bending and feeding belt running was effected by engaging the belt between a drive pulley having a 120 mm. diameter, and a driven pulley having a 120 mm. diameter. At the same time, a tension pulley having a 50 mm. diameter was engaged with the back of the belt so as to cause the contacting angle of the tension pulley with respect to the belt to be approximately 120°. The drive pulley was driven at 360 rpm, and no load was applied to the driven pulley.

The wear resistance of the belt was determined by driving the belt from a driver pulley having a 142 mm. diameter at 1000 rpm, with a variation in the speed of approximately 12%. The belt was engaged with a first driven pulley having a diameter of 127 mm. and a second driven pulley having a diameter of 65 mm., with a load of 2 ps.

The physical properties of the vulcanized material are shown in Table 2 herefollowing.

TABLE 2

| | Comparison Example | | | Example | |
|---|---|---|---|---|---|
| | 1 | 2 | 2 | 1 | 1 |
| (Parallel with buried cords) | | | | | |
| Hardness (JISA) | 83 | 85 | 87 | 85 | 86 |
| 10% modulus (kg/cm$^2$) | 45 | 53 | 72 | 62 | 69 |
| Tensile strength (kg/cm$^2$) | 154 | 150 | 119 | 150 | 143 |
| (Perpendicular with buried cords) | | | | | |
| 10% modulus (kg/cm$^2$) | 38 | 47 | 59 | 41 | 43 |
| Tensile strength (kg/cm$^2$) | 117 | 103 | 94 | 114 | 112 |
| Elongation (%) | 310 | 260 | 230 | 286 | 275 |

TABLE 3

|  | Comparison Example | | | Example | |
| --- | --- | --- | --- | --- | --- |
|  | 1 | 2 | 3 | 1 | 2 |
| Reverse bending and running test) | | | | | |
| Crack occurring time (Hr) | 256 | 210 | 180 | 264 | 244 |
| (n = 2) | 272 | 235 | 207 | 240 | 252 |
| (3-axis feeding test) | | | | | |
| Wear reduction (5) | −1.64 | −1.51 | −1.05 | −0.53 | −0.40 |

As can be seen from Table 3, the V-ribbed belts embodying the invention provide substantial improvement in the wear resistance as compared to the conventional V-ribbed belt structures. As shown in Table 3, the belts utilizing the invention provide improved buckling resistance.

Referring now to Table 4, five examples of toothed belts embodying the invention were constructed and compared with a prior art belt of similar construction but without the whiskers of the present invention. In the toothed belt examples, the tensile cords were formed of glass fiber and the cover fabric was formed of wooly polyamide fiber treated in advance with RFL solution impregnated with rubber paste made by dissolving rubber composition in toluene. The fabric was dried at 100° to 150° C. and adhered to the belt body by a rubber mixture containing 10 to 50 parts by weight of solid content in 100 parts by weight of polyamide fiber. The belts had 83 teeth, each 19.1 mm. in width, and a trapezoidal toothform. The driver pulley had 18 teeth and was driven at 7200 rpm. The driven pulley was provided with 36 teeth and, thus, rotated at 3600 rpm. The test was conducted at a temperature of 130° C. ambient, and was run for 200 hours under a load condition of 5 ps at 120° of reverse bending angle of the tension pulley, which had a diameter of 52 mm.

The remainder of the canvas was determined by dividing the thickness difference before running and after running by the thickness before running. The thickness of the canvas was measured by a projector with a sample cut at the grooves of the belt.

TABLE 4

|  | Comparison Example | Example | | | | |
| --- | --- | --- | --- | --- | --- | --- |
|  | 4 | 3 | 4 | 5 | 6 | 7 |
| Chlorosulfonated polyethylene | 100 | 100 | 100 | 100 | 100 | 100 |
| Magnesium oxide | 4 | 4 | 4 | 4 | 4 | 4 |
| HAF carbon black | 50 | 50 | 50 | 50 | 50 | 50 |
| Process oil | 10 | 10 | 10 | 10 | 10 | 10 |
| Diphenylamine derivatives | 4 | 4 | 4 | 4 | 4 | 4 |
| Sulfur | 2.5 | 2.5 | 2.5 | 2.5 | 2.5 | 2.5 |
| Silicon carbide whisker | 0 | 2 | 10 | 40 | 60 | 80 |
| (Belt running test) | | | | | | |
| Remainder of Canvas thickness (%) | 30 | 50 | 90 | 80 | 75 | 35 |

As can be seen from Table 4, use of more than 60 parts by weight of whiskers in the rubber causes the remainder of the canvas to decrease. Further, the rubber tended to separate from the fabric and tended to pile.

The results of the tests indicate the substantial improvement afforded by the inclusion of the whiskers in the rubber layers of the belt, as well as in the rubber impregnation material of the fabric cover.

The foregoing disclosure of specific embodiments is illustrative of the broad inventive concepts comprehended by the invention.

We claim:

1. A power transmission belt wherein at least a portion thereof is formed as a composite of 1 to 100 parts by weight of acicular, single crystal whiskers having a length in the range of approximately 10 to 500 microns and a diameter in the range of approximately 0.1 to 1.0 microns distributed in 100 parts by weight of rubber.

2. The power transmission belt of claim 1 wherein said belt comprises a frictional power transmission belt and said rubber composite defines a compression layer portion of the belt.

3. The power transmission belt of claim 1 wherein said belt is provided with a cover fabric having said rubber composite impregnated therein.

4. The power transmission belt of claim 1 wherein said whiskers are formed of any one or more of the group consisting of alpha-silicon carbide, beta-silicon carbide, and silicon nitride.

5. The power transmission belt of claim 1 wherein said whiskers are formed of any one of the group consisting of alpha-alumina, titanium oxide, zinc oxide, and tin oxide.

6. The power transmission belt of claim 1 wherein said whiskers are formed of any one of the group consisting of iron, copper and nickel.

7. The power transmission belt of claim 1 wherein said whiskers are formed of graphite.

8. The power transmission belt of claim 1 wherein said whiskers are formed of any one or more of the group consisting of alpha-silicon carbide, beta-silicon carbide, silicon nitride, alpha-alumina, titanium oxide, zinc oxide, tin oxide, iron, copper, nickel and graphite.

9. The power transmission belt of claim 1 wherein said whiskers are present in an amount of 2–60 parts by weight to 100 parts by weight of the rubber.

10. The power transmission belt of claim 1 further including a coupling agent.

11. The power transmission belt of claim 1 wherein said whiskers are formed of any one or more of the group consisting of alpha-silicon carbide, beta-silicon carbide, silicon nitride, alpha-alumina, titanium oxide, zinc oxide, tin oxide, iron, copper, nickel and graphite, said whiskers having a diameter in the range of approximately 0.1 micron to 1.0 micron.

12. The power transmission belt of claim 1 wherein said whiskers are formed of any one or more of the group consisting of alpha-silicon carbide, beta-silicon carbide, silicon nitride, alpha-alumina, titanium oxide, zinc oxide, tin oxide, iron, copper, nickel and graphite, said whiskers comprising acicular single crystals having a diameter in the range of approximately 0.1 micron to 1.0 micron.

13. The power transmission belt of claim 1 wherein said rubber consists of any one or more of the group consisting of chloroprene rubber, nitrile rubber, natural rubber, styrene butadiene rubber, hydrogenated nitrile rubber, chlorosulfonated polyethylene rubber, epichlorohydrin rubber, and acryl rubber.

14. The power transmission belt of claim 1 wherein said whiskers comprise ceramic whiskers.

15. The power transmission belt of claim 1 wherein said belt comprises a toothed belt and said whiskers are provided in the teeth thereof.

16. The power transmission belt of claim 1 wherein said whiskers are oriented transversely of the belt.

17. A power transmission belt wherein at least a portion thereof is formed as a composite of 1 to 100 parts by weight of acicular, single crystal ceramic whiskers having a length in the range of approximately 10 to 500 microns and a diameter in the range of approximately 0.1 to 1.0 microns and 5 to 10 parts by weight of ceramic powder filler, distributed in 100 parts by weight of rubber.

18. The power transmission belt of claim 17 wherein cut fibers are further provided in said composite.

19. The power transmission belt of claim 17 wherein said belt is provided with a fabric cover and at least a portion of said whiskers are provided in said fabric cover.

* * * * *